(12) United States Patent  
Facchini (10) Patent No.: US 7,240,779 B2  
(45) Date of Patent: Jul. 10, 2007

(54) TRANSMISSION DEVICE

(76) Inventor: Edoardo Facchini, Via Damiano, Pordenone (IT) I-33100

( * ) Notice: Subject to any disclaimer, the term of this patent is extended or adjusted under 35 U.S.C. 154(b) by 165 days.

(21) Appl. No.: 10/517,340

(22) PCT Filed: Jun. 9, 2003

(86) PCT No.: PCT/IB03/02169

§ 371 (c)(1),
(2), (4) Date: Dec. 9, 2004

(87) PCT Pub. No.: WO03/104672

PCT Pub. Date: Dec. 18, 2003

(65) Prior Publication Data

US 2005/0173217 A1 Aug. 11, 2005

(30) Foreign Application Priority Data

Jun. 10, 2002 (IT) .......................... UD2002A0130

(51) Int. Cl.
*F16D 15/00* (2006.01)
*F16D 23/12* (2006.01)
(52) U.S. Cl. .............................. 192/27; 192/28; 192/35
(58) Field of Classification Search ................... 192/27
See application file for complete search history.

(56) References Cited

U.S. PATENT DOCUMENTS 767,844 A * 8/1904 Smith ........................... 192/27
2,583,544 A 4/1952 Burdick
2,965,204 A * 12/1960 Howard ........................ 192/27
3,300,002 A * 1/1967 Roper .......................... 192/35
3,406,797 A * 10/1968 Toussaint ..................... 192/27
4,427,521 A 1/1984 Guillaumont
5,109,964 A 5/1992 Fukui et al.
5,170,870 A 12/1992 Kampf
5,819,583 A 10/1998 Matsushima et al.
5,927,455 A * 7/1999 Baker et al. .................. 192/36
6,257,386 B1 7/2001 Saito et al.

FOREIGN PATENT DOCUMENTS

| AT | 142282 | 2/1984 |
| EP | 0791748 | 8/1997 |
| GB | 2241755 | 9/1991 |
| WO | 8202869 | 9/1982 |

* cited by examiner

*Primary Examiner*—Rodney H. Bonck
(74) *Attorney, Agent, or Firm*—Stevens, Davis, Miller & Mosher, LLP (57) ABSTRACT

Transmission device comprising a first rotary member mounted coaxially on a second rotary member. The first rotary member can rotate in one direction independently from the second rotary member, and in the opposite direction is constrained to the second rotary member in order to rotate solidly therewith. The device can assume a first and a second condition of use, wherein the first rotary member rotates in the two directions independently from the second rotary member, and a third condition of use wherein clamping means, integrally associated with the first rotary member, move from a position of non-interference to a constraint position wherein they constrain the second rotary member in order to make the first rotary member and the second rotary member rotationally solid.

28 Claims, 10 Drawing Sheets fig. 1a fig. 1b fig. 1c fig. 2 fig. 3 fig. 4 fig. 5 fig. 6 fig. 7 fig. 9 fig. 10 fig. 11a fig. 11b fig. 11c fig. 12

US 7,240,779 B2

TRANSMISSION DEVICE

This is the U.S. National Stage of Patent Cooperation Treaty Application No. PCT/IB03/02169 having an international filing date of 9 Jun. 2003 and claiming priority from Italian Patent Application No. UD2002A000130 filed on 10 June 2002.

FIELD OF THE INVENTION

The present invention concerns a transmission device which allows the free rotation, in both directions, of a driven wheel with respect to a shaft on which it is mounted and the selective clamping of the wheel on said shaft in order to determine the solid rotation of the two.

BACKGROUND OF THE INVENTION

Free wheels are known, which can rotate in a single direction independently with respect to a rotary member, for example a shaft, on which they are mounted coaxially, while, when the direction of rotation is inverted, they are clamped on said member, so as to rotate solidly therewith. The limitation of free wheels is that their rotation, independent with respect to the member on which they are mounted, can occur, as we said, only in one of the two directions, since the rotation in the opposite direction automatically implies that the wheel is clamped on said member.

In some applications it becomes necessary to use transmission devices with wheels able to rotate independently from the relative rotating mounting member in both directions, and be clamped, selectively and on command, on said member in order to make the rotation thereof uniform.

In order to achieve this condition, complex transmission devices have been proposed which provide to use external clamping elements such as joints, jaws or suchlike, and do not in any case allow, during the clamping step, sufficiently rapid response times.

WO-A-82/02869 discloses a coupling device for the coupling up or uncoupling of a drive roller for a coupling conveyor. The coupling device comprises first and second coupling members. The second coupling member comprises a plurality of coupling hook elements, pivotally mounted about their pivot shafts in a holder. Each of the coupling hook is constructed in the form of a swinging lever with a hooking portion and a control portion. The coupling device also includes a control arm which comprises a control portion. The control arm is adapted to be displaced along a guide, parallel to the direction of the tangent to a control ring, between a lower position in which the coupling device is in the coupling position, and an activation position in which the control arm causes a radial displacement of the control ring in a position which is eccentric in relation to the pivot shaft. This causes the uncoupling between the first and the second coupling member, because the second coupling member ceases to rotate while the first coupling member can continue its rotation.

A major shortcoming of this device is the out-of-center (eccentric) and asymmetrical positioning of the control ring with respect to the pivot shaft in order to obtain the uncoupling between the first and the second members.

AT-B-142.282 discloses a coupling/uncoupling device able to be activated only above a pre-determined rotational speed. The two bodies are always meshed each other and they disengaged when the rotational speed reaches a pre-set value. Moreover, when the two bodies are engaged each other, they can rotate in one sense only.

Applicant has devised and embodied the present invention to overcome these shortcomings of the state of the art and to obtain other advantages.

SUMMARY OF THE INVENTION

The present invention is set forth and characterized essentially in the main claim, while the dependent claims describe other innovative characteristics of the invention.

The purpose of the invention is to achieve a simple and compact transmission device in which a driven wheel can rotate freely in both directions with respect to a rotary member on which it is mounted and wherein, for at least one direction of rotation of said wheel, advantageously for both, it is possible to achieve a selective and reciprocal clamping of the wheel and the relative rotating mounting member in order to render the rotation of the two solid.

In accordance with this purpose, the transmission device according to the present invention comprises at least a first rotary member, or driven wheel, integrally including clamping means, and a second rotary member, or shaft, mounted coaxially with each other; the device also comprises a braking member able to selectively cooperate with the first rotary member.

It comes within the field of the invention that the first rotary member is the shaft and the second rotary member is the driven wheel.

In a first and in a second condition of use of the device according to the invention, the first rotary member is able to rotate in both directions independently from the second rotary member.

In a third condition of use, the braking member acts on the first rotary member to take the relative clamping means from a position of non-interference to a constraint position wherein it constrains the second rotary member, rendering the two rotary members rotationally solid with each other, due to interference or reciprocal attachment.

According to one embodiment of the invention, the first rotary member comprises at least two components associated axially with each other and between which anti-friction means are present; a first component includes guide means along which the clamping means, constrained to the second component, are able to slide, or to oscillate, when said second component is braked by the braking member, in order to move from the position of non-interference to the constraint position. In a preferential embodiment, the first rotary member comprises two first components between which a second component is present on which the braking member is able to act.

In one form of embodiment of the invention, the first rotary member comprises a wheel and each component thereof consists of a disk, while the second rotary member comprises a shaft coaxially associated with a relative bushing on which the clamping means act.

According to a preferential embodiment, the clamping means comprise a plurality of sliding clamping blocks, housed around the periphery of the rotary member and kept in a position of non-interference by relative elastic means; the clamping means are able to close, or attach, simultaneously on the second rotary member when induced to move to the constraint position. Moreover, the guide means of the first component/components comprise a plurality of hollows, with whose inner surfaces the clamping means cooperate; in one embodiment, the inner surfaces include at least a deviation segment converging towards the second rotary member, which deviation segment is traveled by the clamping means in order to move from the position of non-interference to the constraint position.

In a first embodiment, the deviation segment is asymmetric with respect to the position of non-interference of the clamping means and allows the latter to move to the constraint position only in one direction of rotation of the first rotary member. According to a variant, the deviation segment is symmetrical with respect to the position of non-interference of the clamping means and therefore allows the latter to move to the constraint position irrespective of the direction of rotation of the first rotary member.

According to a variant, the clamping means are of the type that oscillate from the position of non-interference to the constraint position.

BRIEF DESCRIPTION OF THE DRAWINGS

These and other characteristics of the present invention will become apparent from the following description of a preferential form of embodiment, given as a non-restrictive example, with reference to the attached drawings wherein.

DETAILED DESCRIPTION OF A PREFERENTIAL FORM OF EMBODIMENT OF THE INVENTION

With reference to the attached figures, the number 10 denotes in its entirety the transmission device according to the present invention.

Figure 1A:
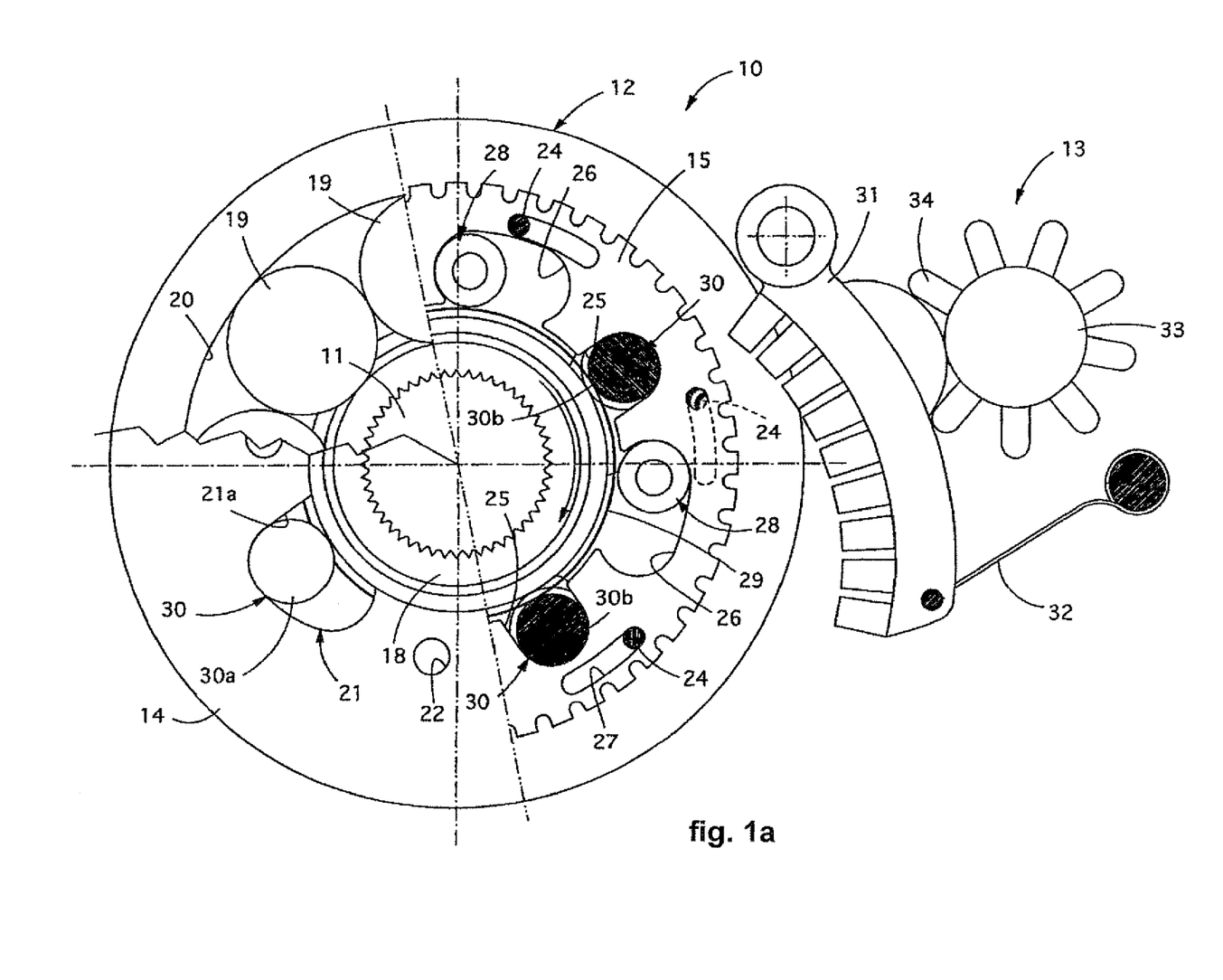
FIG. 1a shows in a partly sectioned front view, a transmission device according to the present invention in a first condition of use.
Figure 2:
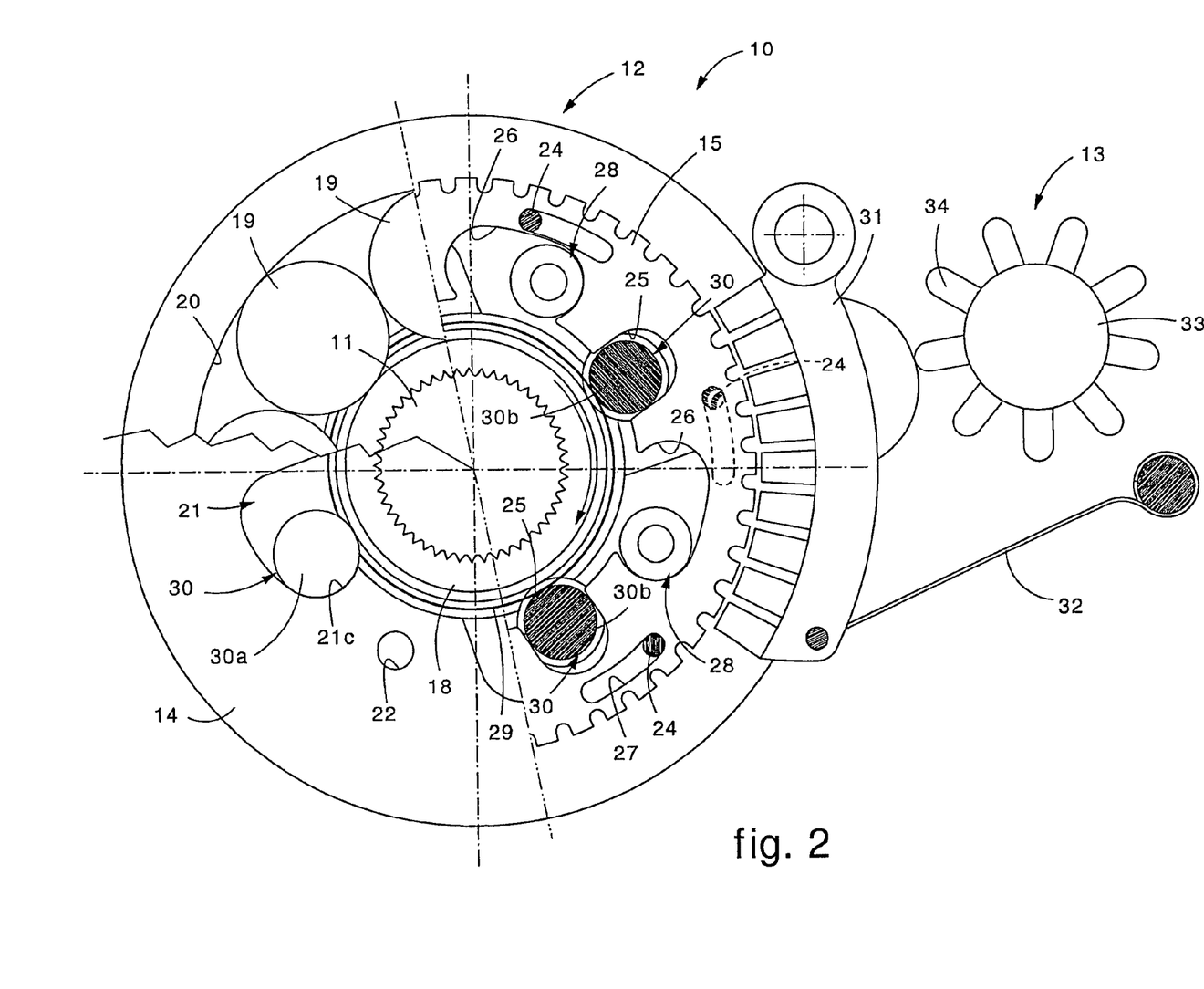
FIG. 2 shows the device in FIG. 1 in another condition of use.

The device 10 comprises a wheel 12, mounted idle coaxially on a rotary shaft 11, in this case of the thin-ribbed type, and a braking device 13, shown schematically in FIGS. 1 and 2, able to act on the wheel 12. The wheel 12 is able to be made to rotate in both directions by means that are not shown here and comprises three disks associated with each other, two outer disks 14, specular with respect to each other, and an intermediate disk 15, all including respective central apertures 16 and 17 for coupling with the shaft 11.

Figure 3:
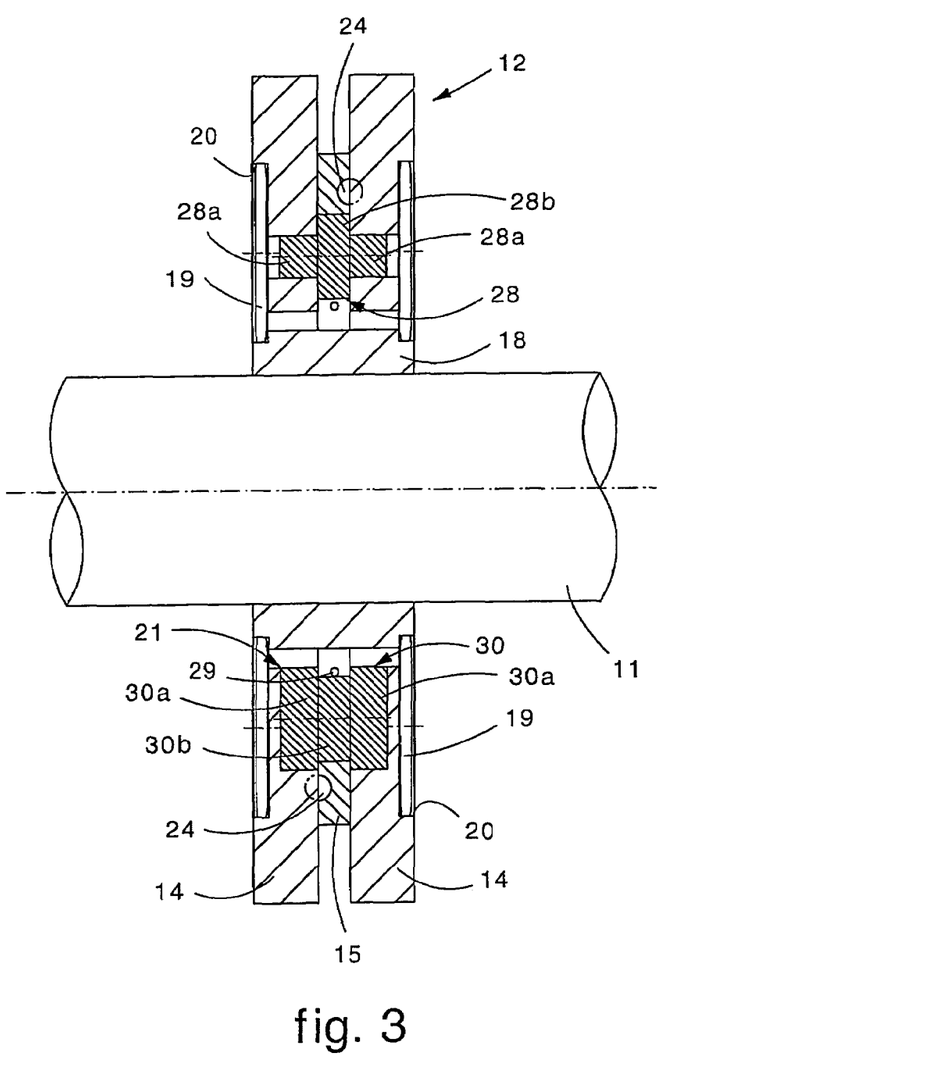
FIG. 3 shows a transverse section of the device in FIG. 1.
Figure 4:
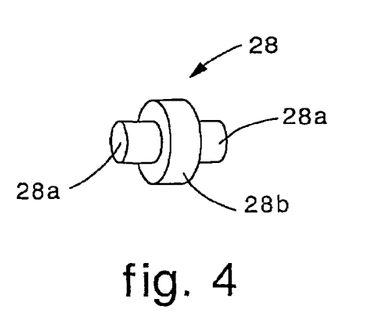
FIGS. 4 and 5 show two details of the device according to the invention.
Figure 5:
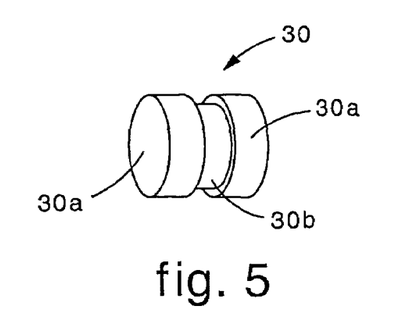
Figure 8:
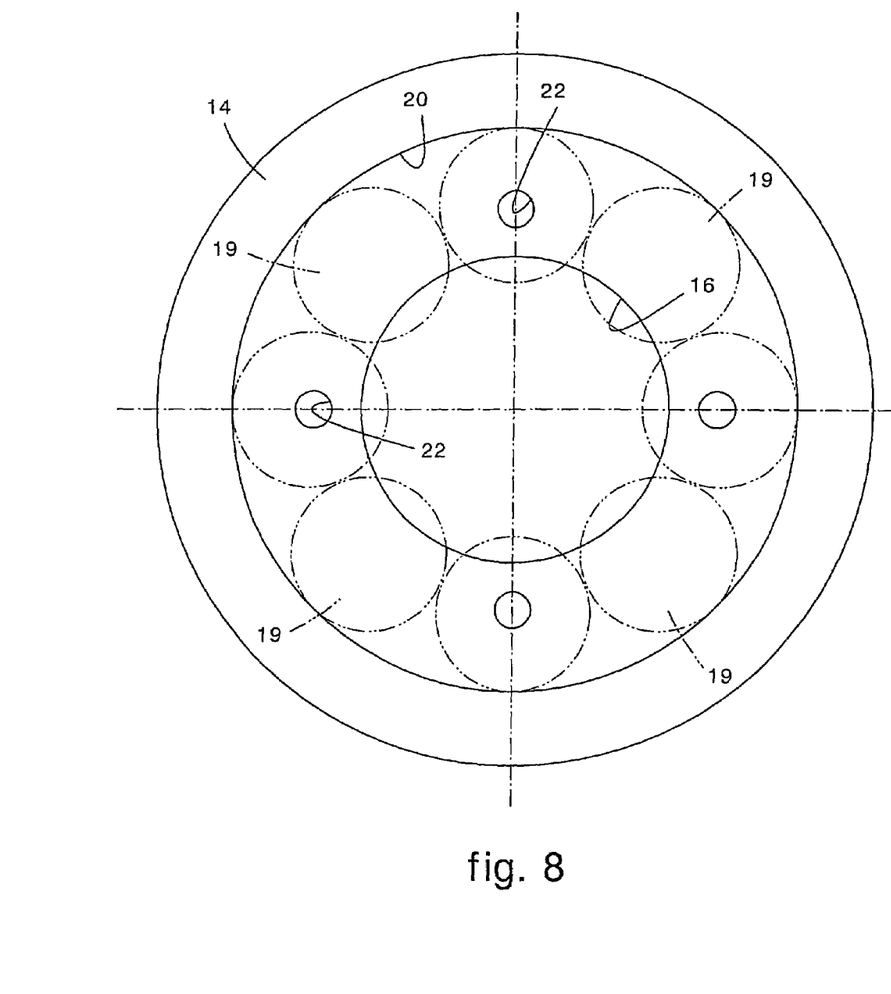
FIG. 8 shows the view from the outer side of the component in FIG. 6.

This coupling is achieved, in this case, by means of a thin-ribbed bushing 18 on whose peripheral surface a plurality of rollers 19 slide, functioning as bearings, housed in seatings 20 made on the outer face of each of the two outer disks 14 (FIGS. 3 and 8).

Figure 6:
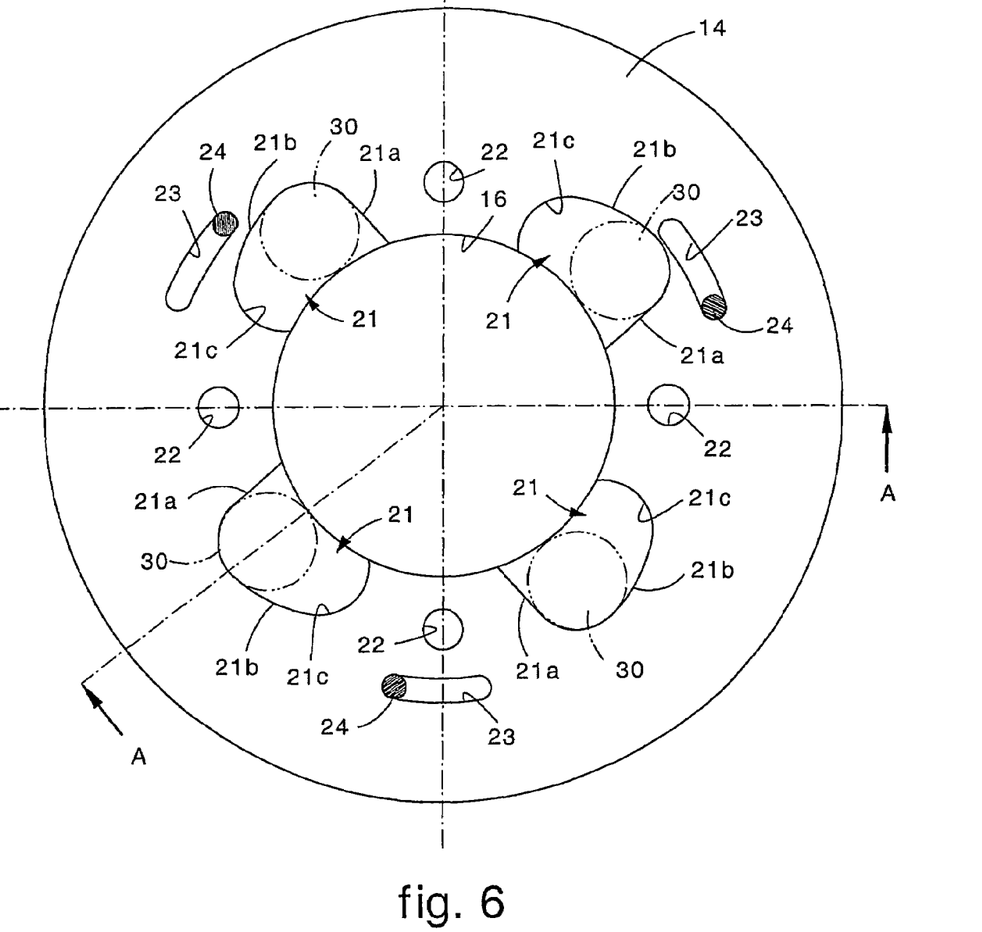
FIG. 6 shows a component of the device in FIG. 1 with a view from the inner side.
Figure 7:
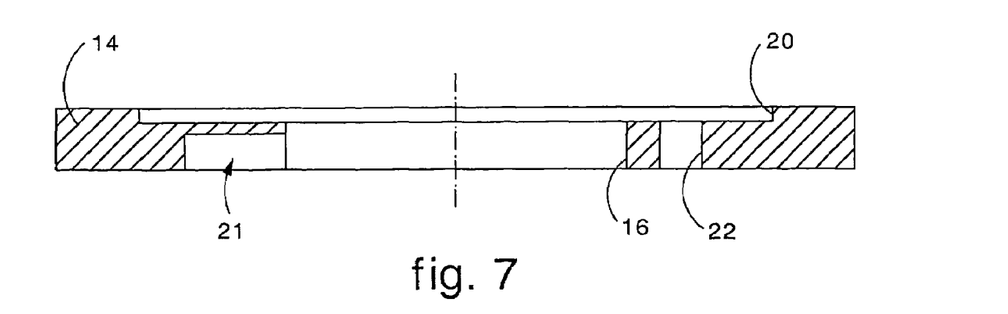
FIG. 7 shows the section from A to A of FIG. 6.

In the case shown here, each outer disk 14 comprises, on its inner face, four guide hollows 21 made in bas-relief, arranged circularly, angled by 90° from each other and communicating with the central aperture 16. It is obvious, however, that there can be a different number of guide hollows 21 present, and they may be arranged according to a different angulation.

The guide hollows 21 have curved inner surfaces which, with reference to FIG. 6, each comprise: a first loop-shaped segment 21a, a second deviation segment 21b, converging towards the central aperture 16, if traveled in an anti-clockwise direction, and a third loop-shaped segment 21c. In alternation with the guide hollows 21, each outer disk 14 has four through holes 22, also arranged circularly and arranged at 90° from each other.

On the inner face, each outer disk 14 also has three arched grooves 23, arranged at 120° from each other, inside which a small ball 24 is half inserted; the arched grooves 23 of one outer disk 14 are arranged offset by 60° with respect to the arched grooves 23 of the other outer disk 14.

The intermediate disk 15 (FIG. 9) has four through cavities 25, substantially semi-circular in shape and communicating with the central aperture 17, arranged in correspondence with the guide hollows 21 of the outer disks 14.

Figure 9:
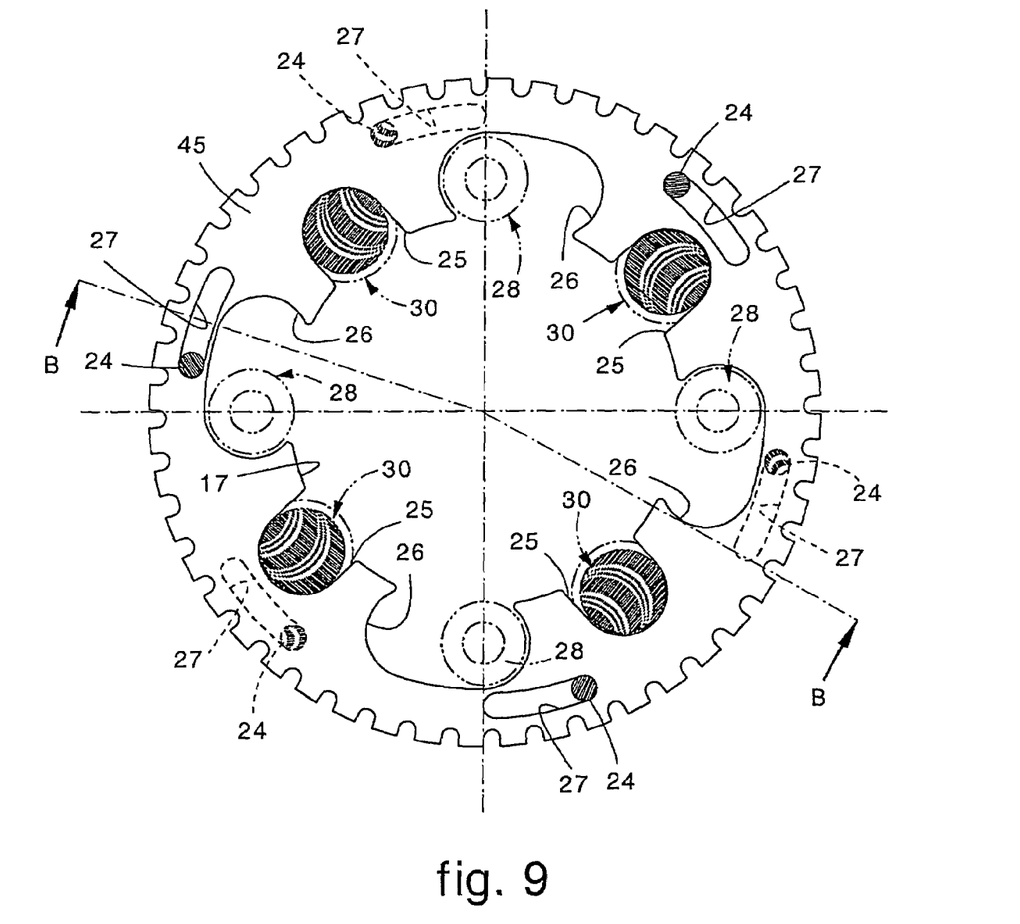
FIG. 9 shows another component of the device in FIG. 1.
Figure 10:
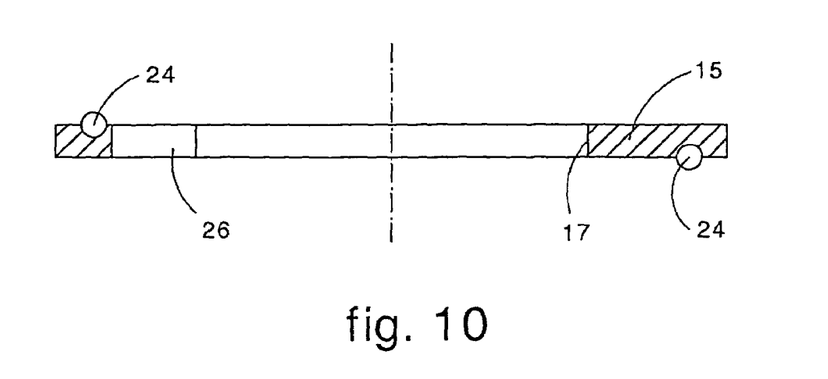
FIG. 10 shows the section from B to B of FIG. 9.

In alternation with the through cavities 25, the intermediate disk 15 has four eyelets 26 made in correspondence with the through holes 22 of the outer disks 14.

More peripherally, the intermediate disk 15 is provided with six arched grooves 27, three on one side, arranged at 120° from each other and facing three mating arched grooves 23 of a first outer disk 14, and three on the other side, also arranged at 120° from each other and facing three mating arched grooves 23 of a second outer disk 14.

Into each arched groove 27 the part of the ball 24 emerging from the corresponding arched groove 23 of the outer disk 14 is inserted.

The association of the two outer disks 14 and the intermediate disk 15 is achieved by means of four pin elements 28, functioning as spacers, having centrally a collar 28b with a bigger diameter than the two ends 28a.

To be more exact, each pin element 28 is inserted and clamped with one end 28a in a first through hole 22 of an outer disk 14 and with the other end 28a in a second through hole 22, aligned with the first, of the other outer disk 14; the collar 28b is housed inside the eyelet 26 of the intermediate disk 15, which eyelet 26 is present between the through holes 22 and inside which eyelet 26 the collar 28b can slide. Inside the guide hollows 21 and the mating cavities 25 respective sliding clamping blocks 30 are housed, having the ends 30a thicker and a narrower part 30b between them.

To be more exact, each sliding clamping block 30 has an end 30a inserted in a first guide hollow 21 of an outer disk 14 and the other end 30a inserted in a second guide hollow 21, aligned with the first, of the other outer disk 14, while the narrower part 30b is inserted and constrained in the mating through cavity 25. A spring 29, including at least a respective segment able to overlap another and cooperating with the narrower parts 30b of the sliding clamping blocks 30, keeps the latter thrust inside the respective through cavities 25. In this condition the sliding clamping blocks 30 can slide along the inner surfaces of the relative guide hollows 21, whereas with respect to the through cavities 25 they can only, by compressing the spring 29, move radially towards the central aperture 17.

In the embodiment shown here, the braking member 13 comprises an interference element 31, associated with respective elastic contrasting means 32, on which a thruster element 33 acts, of a rotary type and including protruding profiles 34. The rotation of the thruster element 33 takes the relative protruding profiles 34 in abutment on the interference element 31 which is thrust into contact with the intermediate disk 15, braking it.

The device 10 has three functioning conditions: a first condition wherein the wheel 12 and the shaft 11 rotate in a concordant direction and independently from each other; a second condition wherein the wheel 12 and the shaft 11 rotate in a reciprocally inverse direction and independently from each other; and a third condition wherein the wheel 12 and the shaft 11 rotate solidly with each other. In FIG. 1 the first two functioning conditions are schematized, wherein, supposing that the shaft 11 rotates in a clockwise direction, the wheel 12 can rotate independently from the shaft 11, both in a clockwise direction and in an anti-clockwise direction; in these functioning conditions the braking member 13 is kept dis-activated.

In the first condition, the clockwise torque applied to the wheel 12 is transmitted from the outer disks 14 to the intermediate disk 15 by means of the sliding clamping blocks 30, which are kept by the spring 29 with the ends 30*a* thrusting against the first loop-shaped segment 21*a* of the guide hollows 21, in a position of non-interference with the thin-ribbed bushing 18; the narrower parts 30*b* of the sliding clamping blocks 30 are in contact with the walls of the relative through cavities 25, to which they transmit the thrust, so as to draw the intermediate disk 15. In the second condition, the anti-clockwise torque applied to the wheel 12 is transmitted from the outer disks 14 to the intermediate disk 15 by means of the pin elements 28 which, clamped at the ends 28*a* inside the through holes 22 of the outer disks 14, are arranged with the collar 28*b* thrusting against one end of the eyelets 26 of the intermediate disk 15.

Figure 1B:
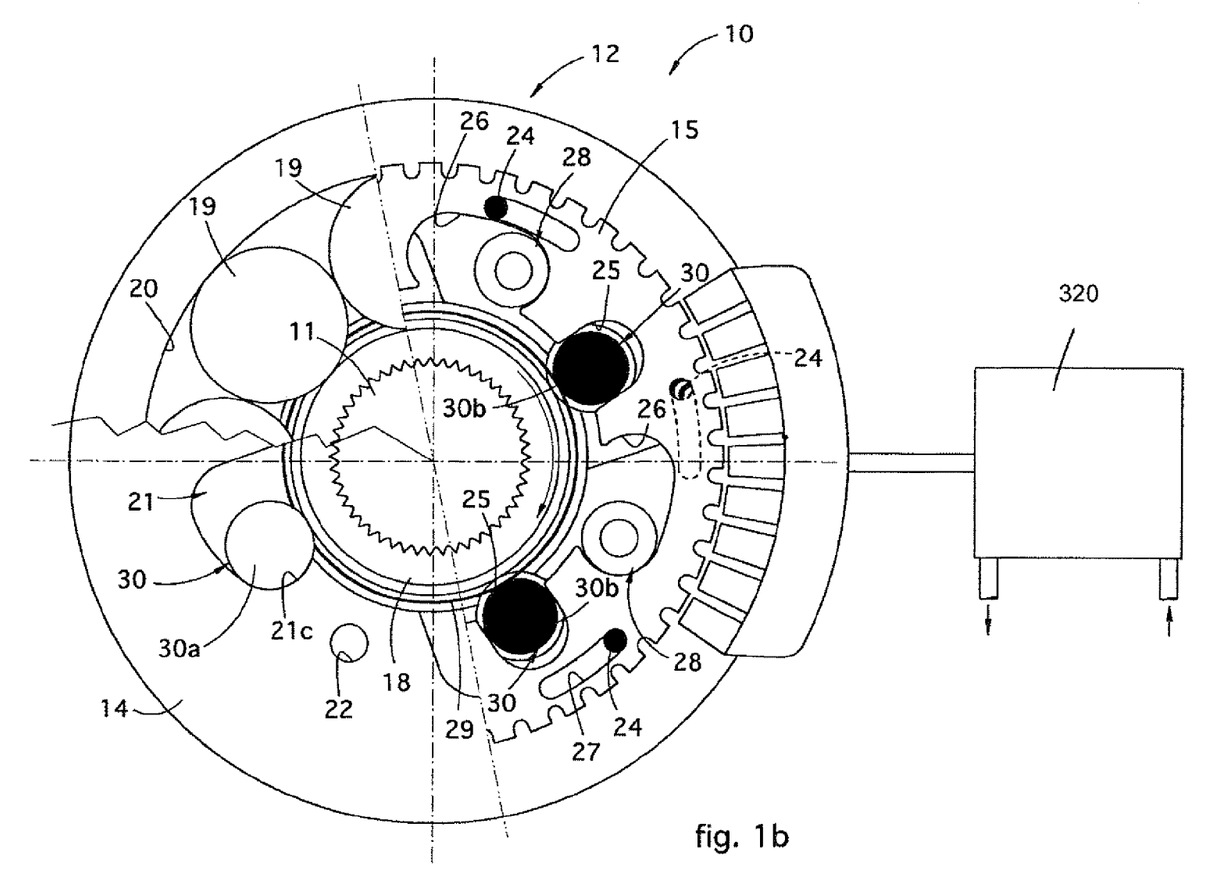
FIGS. 1b and 1c show respective configurations having a fluid-dynamic type braking member and a magnetic-electromagnetic type braking member.
Figure 1C:
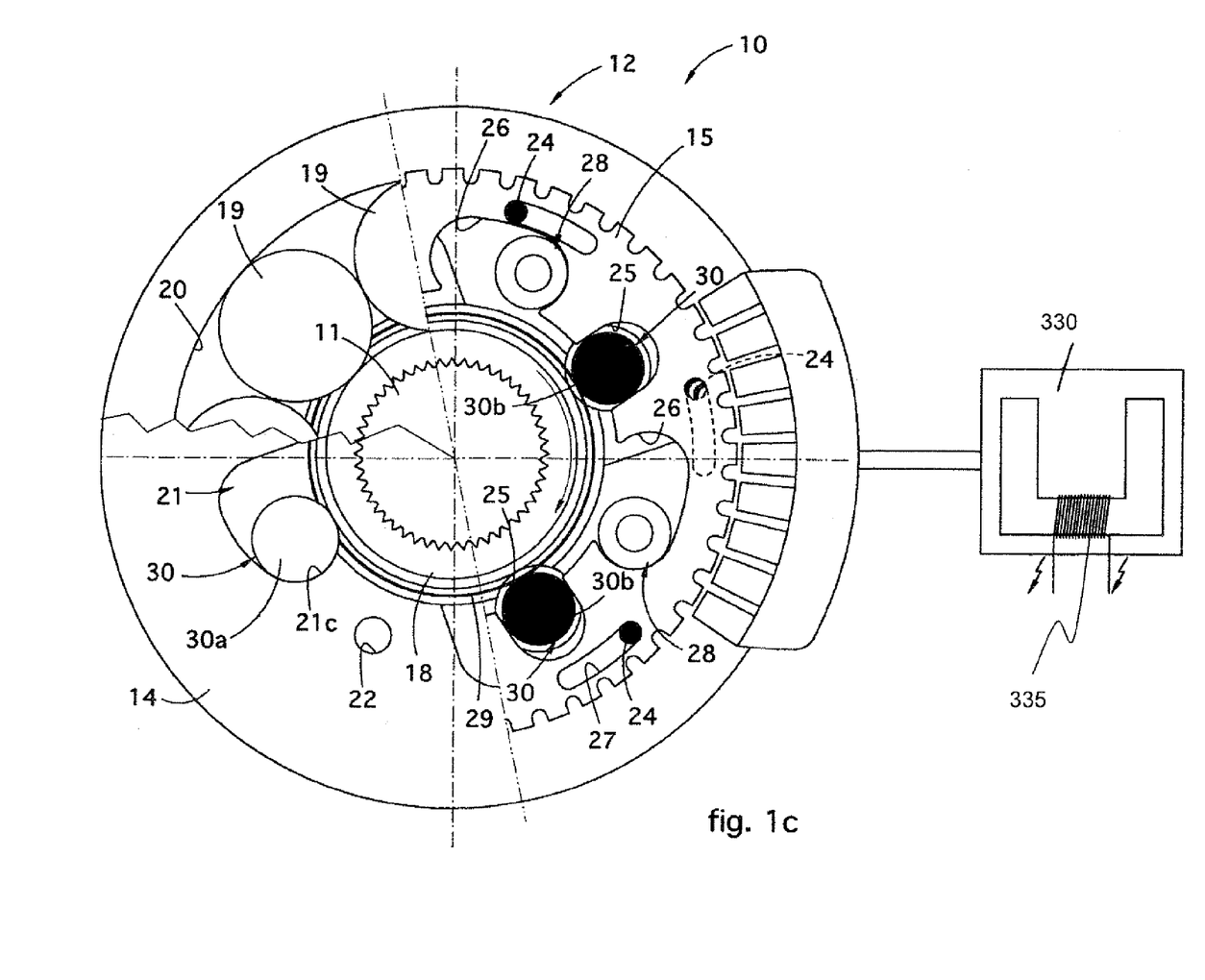

FIGS. 1*b* and 1*c* show respective configurations having a fluid-dynamic type braking member 320 and a magnetic-electromagnetic type braking member 330, wherein an artisan understands the magnetic or electromagnetic induction provided by braking member 330 would include a coil 335. It is understood by an artisan that any braking system can be used that provides external action to activate the braking function.

In the first and second condition, the free movement of the wheel 12 around the shaft 11 is guaranteed by the presence of the rollers 19.

The third condition is obtained, starting from the first functioning condition, wherein the wheel 12 and the shaft 11 rotate in the same direction, in this case clockwise, by activating the braking member 13.

Driving the braking member 13, in fact, determines the slowdown of the intermediate disk 15 with respect to the outer disks 14, which continue to rotate with respect to the intermediate disk 15, sliding thereon due to the presence of the balls 24.

The reciprocal rotation of the outer disks 14 and the intermediate disk 15 takes the ends 30*a* of the sliding clamping blocks 30 to slide along the inner surfaces of the respective guide hollows 21, moving from the first loop-shaped segment 21*a* along the second deviation segment 21*b*, approaching the central aperture 16, until the third loop-shaped segment 21*c* is reached.

The sliding of the sliding clamping blocks 30 causes the spring 29 to compress, which reduces its diameter due to the overlapping of its two segments, and takes the sliding clamping blocks 30 themselves to clamp on the thin-ribbed bushing 18 once the third loop-shaped segment 21*c* has been reached, while the pin elements 28 move from one end of the eyelets 26 to the other (FIG. 2).

In this way we constrain the wheel 12 on the thin-ribbed bushing 18 and this determines the solid rotation of the shaft 11 and the wheel 12.

The wheel 12 is dis-engaged from the thin-ribbed bushing 18, and hence from the shaft 11, when the outer disks 14 are stopped, or considerably slowed down, with the shaft 11 that continues to rotate, due to inertia or because it is driven by its own drive means, and draws the sliding clamping blocks 30 from their constraint position in the third loop-shaped segment 21*c* towards a position of release, that is, of non-interference with the thin-ribbed bushing 18, towards the second deviation segment 21*b*. In this condition, the spring 29 is free to expand and thrusts the sliding clamping blocks 30 into the first loop-shaped segment 21*a* of the respective guide hollows 21, returning the device 10 to the first or second functioning condition.

In this way it is possible to continuously create alternate conditions of constraint/release between the wheel 12 and the shaft 11 (or vice versa in the case where the main drive is imparted by the shaft 11), simply by modifying the relative drive conditions of the two rotary systems, normally independent of each other, which become a single system when the sliding clamping blocks 30 are engaged on the thin-ribbed bushing 18 of the shaft 11.

Figure 11A:
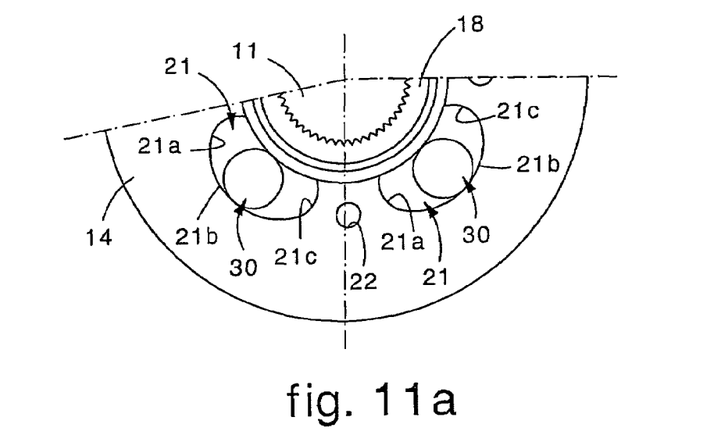
FIGS. 11a-11c show a part view of a transmission device according to a variant of the invention in three different conditions of use.
Figure 11B:
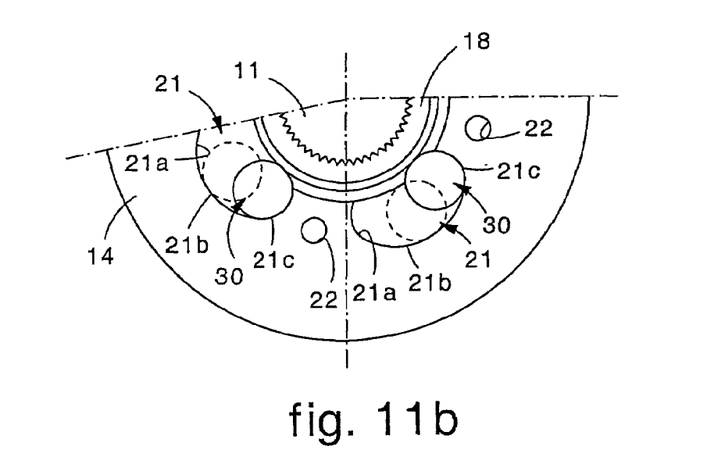
Figure 11C:
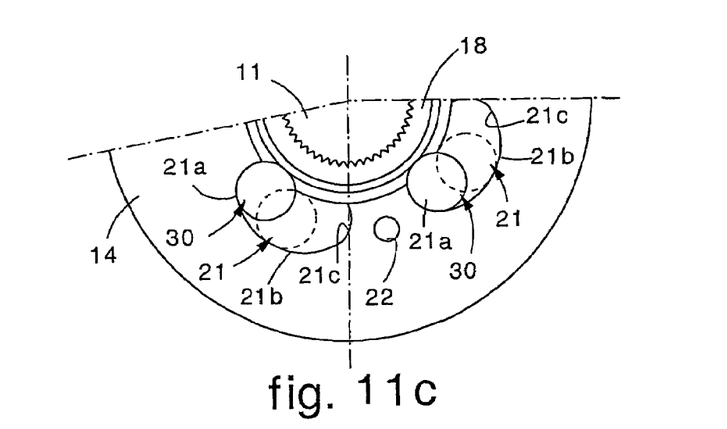

In the variant shown in FIGS. 11*a*-11*c*, the device 10 according to the invention allows the solid rotation of the wheel 12 and the shaft 11 irrespective of whether they rotate in clockwise or anti-clockwise direction.

In this embodiment, the outer disks 14 include guide hollows 21 with a first segment 21*a* and a third segment 21*c*, both loop-shaped, having the same conformation, connected by a second deviation segment 21*b* converging in both directions towards the central aperture 16.

The first and second condition of use are shown schematically in FIG. 11*a*; in these conditions, the sliding clamping blocks 30 are in a central position inside the relative guide hollows 21 and transmit motion to the intermediate disk through a tangential thrust on the second deviation segment 21*b*; the pin elements 28, not shown, are in an intermediate position inside the eyelets 26.

FIG. 11*b* shows the third condition of use of the device 10 when the wheel 12 and the shaft 11 rotate in a clockwise direction; in this case, driving the braking member 13 determines the sliding of the ends 30*a* of the sliding clamping blocks 30 until the third loop-shaped segment 21*c* of the guide hollows 21 is reached, with the consequent constraint of the thin-ribbed bushing 18. FIG. 11*c* shows a further condition of use of the device 10 which allows the solid rotation in an anti-clockwise direction of the wheel 12 and the shaft 11; in this case, driving the braking member 13 causes the ends 30*a* of the sliding clamping blocks 30 to slide towards the first loop-shaped segment 21*a* of the guide hollows 21, until the thin-ribbed bushing 18 is constrained.

Figure 12:
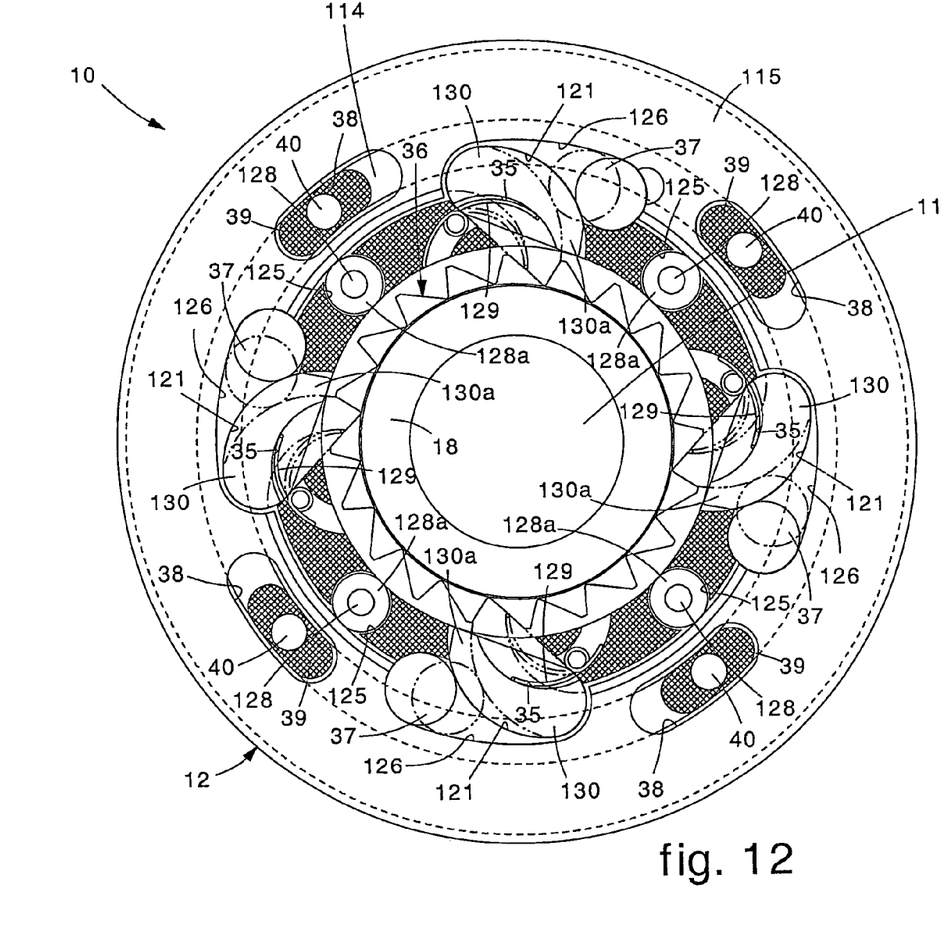
FIG. 12 shows a variant of the device in FIG. 1.

According to the variant shown in FIG. 12, wherein to the same numbers correspond the same parts in the previous figures, the device 10 provides two outer disks 114 including four housing cavities 121, inside which mating oscillating clamping blocks 130 are arranged.

Moreover, the outer disks 114 comprise four semi-circular seatings 125, inside each of which a pin 128 is arranged on which a washer 128*a* is keyed which rotates on the inner diameter of the intermediate disk 115. The function of the washers 128*a* is to improve the reciprocal rotation of the disks 115 and 114.

To be more exact, every oscillating clamping block 130 is substantially drop-shaped and comprises a housing seating 35 inside which at least an axial spring 129 is arranged, able to normally keep the respective oscillating clamping block 130 in a raised position.

In fact, every oscillating clamping block 130 can oscillate between said raised position and a coupling position, wherein at least its pointed part 130a cooperates with a relative tooth of a mating toothing 36 provided on the outer circular surface of the thin-ribbed bushing 18. The coupling position of the oscillating clamping block 130 defines the third condition of use of the device 10, wherein the two rotary members 11 and 12 are reciprocally solid.

The intermediate disk 115 comprises four positioning cavities 126 arranged in correspondence with the housing cavities 121 of the outer disks 114, inside which mating thrust cylinders 37 are able to be arranged, each one arranged constantly in contact with the back of a respective oscillating clamping block 130. Each thrust cylinder 37 rests axially on the inner surfaces of the outer disks 114.

In this way, by slowing down or stopping the rotation of the intermediate disk 115, the thrust cylinders 35 slide relatively inside the positioning cavities 126 and thrust on the backs of the oscillating clamping blocks 130. This thrust exerted by the thrust cylinders 37 overcomes the force of the axial springs 129, thus taking the oscillating clamping blocks 130 into their coupling position.

The intermediate disk 115 also comprises four through eyelets 38 able to allow the housing of relative spacer protuberances 39 of the outer disks 114. The protuberances 39 define the points of reciprocal contact of the two outer disks 114, and in correspondence with them cylindrical holding pins 40 are inserted.

According to a variant of this last embodiment, not shown in the drawings, each oscillating clamping block 130 comprises two opposite pointed parts 130a, two thrust cylinders 37 arranged on opposite sides with respect thereto, while the thin-ribbed bushing 18 comprises two toothings 36, for example coaxial and adjacent, having the teeth directed in opposite directions.

In this way, the oscillating clamping block 130 is normally arranged in its raised position and, in the event of a slowdown or stoppage of the intermediate disk 115, is thrust by one or another of the thrust cylinders 37, according to the direction of rotation of the wheel 12, towards its coupling position, wherein one of its two pointed parts 130a cooperates with the relative toothing 36.

Modifications and/or additions of parts may be made to the transmission device 10 as described heretofore, without departing from the field and scope of the present invention. For example, instead of the braking member 13 shown, any braking member may be used, which is functionally analogous, of a mechanical, hydraulic, pneumatic, magnetic, electromagnetic or any other type.

Moreover, the number of the pin elements 28, or the pins 128, and of the sliding clamping blocks 30 may be different and the pin elements 28 themselves, or the pins 128, can be made in two parts, able to be coupled together, each one made integrally on a relative outer disk 14; or they can be made in two parts, but as components independent from the outer disks 14.

Furthermore, the use of a shaft 11 and of a bushing 18 of the thin-ribbed type is not limitative, since they may include other means of reciprocal coupling such as grooved profiles or suchlike.

With reference to the variant shown in FIGS. 11a-11c, it is also possible to provide that the second deviation segment 21b has at its medium point a housing loop for the ends 30a of the sliding clamping blocks 30, in order to increase the supporting surface for the latter in the first and second condition of use and to facilitate the transmission of the rotation motion from the outer disks 14 to the intermediate disk 15.

The invention claimed is:

1. Transmission device comprising at least a first rotary member mounted coaxially on a second rotary member, said first rotary member being able to rotate at least in one direction independently from said second rotary member, and in the opposite direction, able to be constrained to said second rotary member to rotate solidly therewith, wherein said transmission device is able to assume a first and a second condition of use, wherein said first rotary member is able to rotate in the two directions independently from said second rotary member, and a third condition of use wherein clamping means, integrally associated with said first rotary member, move from a position of non-interference to a constraint position wherein they constrain said second rotary member to make said first rotary member and said second rotary member rotationally solid, wherein said first rotary member comprises at least two components, respectively a first component and a second component, axially associated with each other, a first of said components including guide means with respect to which said clamping means are able to slide or oscillate to move from said position of non-interference to said constraint position.

2. Device as in claim 1, comprising a braking member able to cooperate selectively with said first rotary member to take said clamping means from said position of non-interference to said constraint position.

3. Device as in claim 2, wherein said braking member is able to act on said second component.

4. Device as in claim 2, wherein said braking member is of the mechanical type.

5. Device as in claim 2, wherein said braking member is of the fluid-dynamic type.

6. Device as in claim 2, wherein said braking member is of the magnetic or electromagnetic type.

7. Device as recited in claim 2, wherein when the braking member cooperates selectively with said first rotary member, said clamping means are movable instantaneously to said constraint position to constrain said second rotary member.

8. Device as in claim 1, wherein said clamping means are constrained to said second component.

9. Device as in claim 1, wherein said first rotary member comprises two first components between which said second component is present.

10. Device as in claim 1, wherein said clamping means are able to move from said constraint position to said position of non-interference because they are drawn by said second rotary member when the first component/components of said first rotary member is/are stopped or considerably slowed down.

11. Device as in claim 1, wherein said guide means comprise at least a hollow with whose inner surfaces said clamping means are able to cooperate.

12. Device as in claim 11, wherein the inner surfaces of said hollow include at least a segment converging towards said second rotary member.

13. Device as in claim 11, wherein the inner surfaces of said hollow include a first loop-shaped segment, a second sliding segment, converging towards said second rotary member and a third loop-shaped segment.

14. Device as in claim 13, wherein said clamping means are arranged in said first segment in their position of non-interference, follow said second segment in their passage from said position of non-interference to the constraint position and vice versa, and are in said third segment when said constraint position is reached.

15. Device as in claim 13, wherein said first segment and said third segment are specular with respect to said second segment, said clamping means being arranged at the medium point of said second segment in their position of non-interference and moving towards said first segment to reach the constraint position, when said first rotary member rotates in one direction, and towards said third segment, to reach said constraint position, when said first rotary member rotates in the opposite direction.

16. Device as in claim 11, wherein said clamping means comprise a plurality of sliding clamping blocks arranged around the periphery of said second rotary member and kept in position of non-interference by relative elastic means, wherein each of said sliding clamping blocks has at least a wider part inserted inside said hollow and a narrower part constrained inside a cavity of said second component.

17. Device as in claim 1, wherein said clamping means comprise a plurality of sliding clamping blocks arranged around the periphery of said second rotary member and kept in position of non-interference by relative elastic means, said sliding clamping blocks being able to close simultaneously on said second rotary member in said constraint position.

18. Device as in claim 17, wherein said sliding clamping blocks are able to move into abutment with a relative wider part on said second rotary member and cooperate, by means of relative narrower parts, with said elastic means.

19. Device as recited in claim 17, wherein said sliding clamping blocks act radially with respect to a longitudinal axis of said first rotary member.

20. Device as in claim 1, wherein said components are associated with each other by means of pin means including at least an end inserted and clamped in at least a first component and a thicker part, or collar, inserted in an aperture of said second component.

21. Device as in claim 20, wherein said thicker part, or collar, is inserted in an eyelet of said second component inside which said thicker part, or collar is able to slide when said clamping means move from said position of non-interference to said constraint position.

22. Device as in claim 1, wherein between said first component and said second component there are anti-friction means.

23. Device as in claim 22, wherein said anti-friction means comprise a plurality of balls sliding inside relative seatings made between said first and said second component.

24. Device as in claim 1, wherein said clamping means are of the oscillating type, are substantially drop-shaped and comprise at least a pointed part able to selectively cooperate with a mating toothing made on said second rotary member to define said third condition of use, when said braking member acts on said first rotary member and determines the oscillation thereof with respect to the position of non-interference of said clamping means.

25. Device as in claim 24, wherein said second component comprises one or more positioning cavities arranged in correspondence with said guide means, inside which mating thrust elements are able to be arranged, each of said thrust elements being able to be arranged constantly in contact with the back of a respective clamping means and to be thrust to determine the oscillation thereof when said braking member acts on said first rotary member.

26. Device as in claim 1, wherein said first components include a seating for bearing means able to cooperate with said second rotary member.

27. Transmission device comprising at least a first rotary member mounted coaxially on a second rotary member, said first rotary member being able to rotate at least in one direction independently from said second rotary member, and in the opposite direction, able to be constrained to said second rotary member to rotate solidly therewith, wherein said transmission device is able to assume a first and a second condition of use, wherein said first rotary member is able to rotate in the two directions independently from said second rotary member, and a third condition of use wherein clamping means, integrally associated with said first rotary member, move from a position of non-interference to a constraint position wherein they constrain said second rotary member to make said first rotary member and said second rotary member rotationally solid, wherein said first rotary member comprises a wheel consisting of disks and said second rotary member comprises a shaft associated coaxially with a relative bushing with which said clamping means are able to cooperate.

28. Transmission device comprising at least a first rotary member mounted coaxially on a second rotary member, said first rotary member being able to rotate at least in one direction independently from said second rotary member, and in the opposite direction, able to be constrained to said second rotary member to rotate solidly therewith, wherein said transmission device is able to assume a first and a second condition of use, wherein said first rotary member is able to rotate in the two directions independently from said second rotary member, and a third condition of use wherein clamping means, integrally associated with said first rotary member, move from a position of non-interference to a constraint position wherein they constrain said second rotary member to make said first rotary member and said second rotary member rotationally solid, comprising a braking member able to cooperate selectively with said first rotary member to take said clamping means from said position of non-interference to said constraint position, wherein said braking member is of the mechanical type, comprising interference means associated with relative elastic contrasting means and able to move into contact with said first rotary member when a thruster element is driven.

* * * * *